(12) United States Patent
Campbell

(10) Patent No.: US 9,204,041 B1
(45) Date of Patent: Dec. 1, 2015

(54) ROLLING SHUTTER SYNCHRONIZATION

(75) Inventor: Scott Patrick Campbell, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 650 days.

(21) Appl. No.: 13/610,753

(22) Filed: Sep. 11, 2012

Related U.S. Application Data

(60) Provisional application No. 61/667,882, filed on Jul. 3, 2012.

(51) Int. Cl.
| | |
|---|---|
| H04N 5/232 | (2006.01) |
| H04N 5/353 | (2011.01) |
| H04N 5/225 | (2006.01) |
| H04N 5/341 | (2011.01) |
| H04N 13/02 | (2006.01) |
| H04N 13/00 | (2006.01) |
| H04N 13/04 | (2006.01) |
| G08B 13/196 | (2006.01) |
| G06K 9/20 | (2006.01) |
| G02B 27/22 | (2006.01) |
| G03B 35/08 | (2006.01) |
| G03B 37/04 | (2006.01) |
| G03B 9/08 | (2006.01) |

(52) U.S. Cl.
CPC ......... *H04N 5/23238* (2013.01); *H04N 5/3532* (2013.01); *G02B 27/2228* (2013.01); *G03B 9/08* (2013.01); *G03B 35/08* (2013.01); *G03B 37/04* (2013.01); *G06K 2009/2045* (2013.01); *G06T 2207/10021* (2013.01); *G08B 13/19628* (2013.01); *G08B 13/19641* (2013.01); *H04N 5/2252* (2013.01); *H04N 5/2254* (2013.01); *H04N 5/2258* (2013.01); *H04N 5/3415* (2013.01); *H04N 13/0051* (2013.01); *H04N 13/0055* (2013.01); *H04N 13/0242* (2013.01); *H04N 13/0246* (2013.01); *H04N 13/0296* (2013.01); *H04N 13/0425* (2013.01); *H04N 13/0497* (2013.01)

(58) Field of Classification Search
None
See application file for complete search history.

(56) References Cited

U.S. PATENT DOCUMENTS

| | | | |
|---|---|---|---|
| 2009/0135245 A1* | 5/2009 | Luo et al. | 348/36 |
| 2009/0153710 A1* | 6/2009 | John | 348/296 |
| 2010/0245539 A1* | 9/2010 | Lin | 348/36 |
| 2012/0063637 A1* | 3/2012 | Tardif | 382/103 |

OTHER PUBLICATIONS

Ait-Aider et al., Structure and Kinematics Triangulation with a Rolling Shutter Stereo Rig, 2009, IEEE 12th International Conference on Computer Vision (ICCV), 1835-1840.*
Bradley et al., Synchronization and Rolling Shutter Compensation for Consumer Video Camera Arrays, 2009, Computer Vision and Pattern Recognition Workshops, 2009. CVPR Workshops 2009. IEEE Computer Society Conference, 1-8.*

* cited by examiner

*Primary Examiner* — Geepy Pe
*Assistant Examiner* — William Adrovel
(74) *Attorney, Agent, or Firm* — Fenwick & West LLP

(57) ABSTRACT

A camera system configuration generates 2D or 3D images capable of being stitched together to create panoramic images. The configuration detects a communication coupling of at least two cameras for capturing a sequence of images. The cameras themselves are configured such that their rolling shutters mitigate field of view artifacts from adjacent cameras (2D panoramas) and adjacent 3D camera pairs (3D panoramas) by allowing for the substantially temporally-aligned capture of light in overlap regions between adjacent cameras.

21 Claims, 9 Drawing Sheets

ROLLING SHUTTER SYNCHRONIZATION

CROSS REFERENCE TO RELATED APPLICATIONS

The application claims the benefit of Provisional Application No. 61/667,882, filed on Jul. 3, 2012, which is incorporated herein by reference.

BACKGROUND

1. Technical Field

This disclosure relates to a camera system, and more specifically, to a configurable camera system, for capturing 2D and 3D panoramic images or video, that mitigates field of view artifacts.

2. Description of the Related Arts

In recent years, amateur use of digital cameras has increased dramatically as improvements in digital camera technology have allowed cameras to become more affordable and user-friendly. However, advanced forms of digital photography such as panoramic and three-dimensional (3D) panoramic imaging have conventionally been available only to professional photographers and filmmakers. Traditionally, 3D photography requires expensive stereoscopic cameras that are often bulky and difficult to use. Similarly, panoramic photography in two-dimensional (2D) and 3D traditionally requires advanced multi-lens cameras that are not affordable to the amateur photographer or moviemaker.

Some amateur photographers have found success in these areas by capturing a sequence of images from different camera positions or using multiple cameras to capture a sequence of images that are subsequently manipulated to generate panoramic images. However, capturing the sequence of images correctly and the subsequent manipulation of the images requires considerable experience, effort and time—in addition to expensive software—which prevents the majority of amateur photographers from being able to generate such images at all. Furthermore, the capturing methods described above, while acceptable for generating images of static environments with stationary cameras, are not only unwieldy but unacceptable solutions for action shots (moving camera or object), let alone video recordings.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
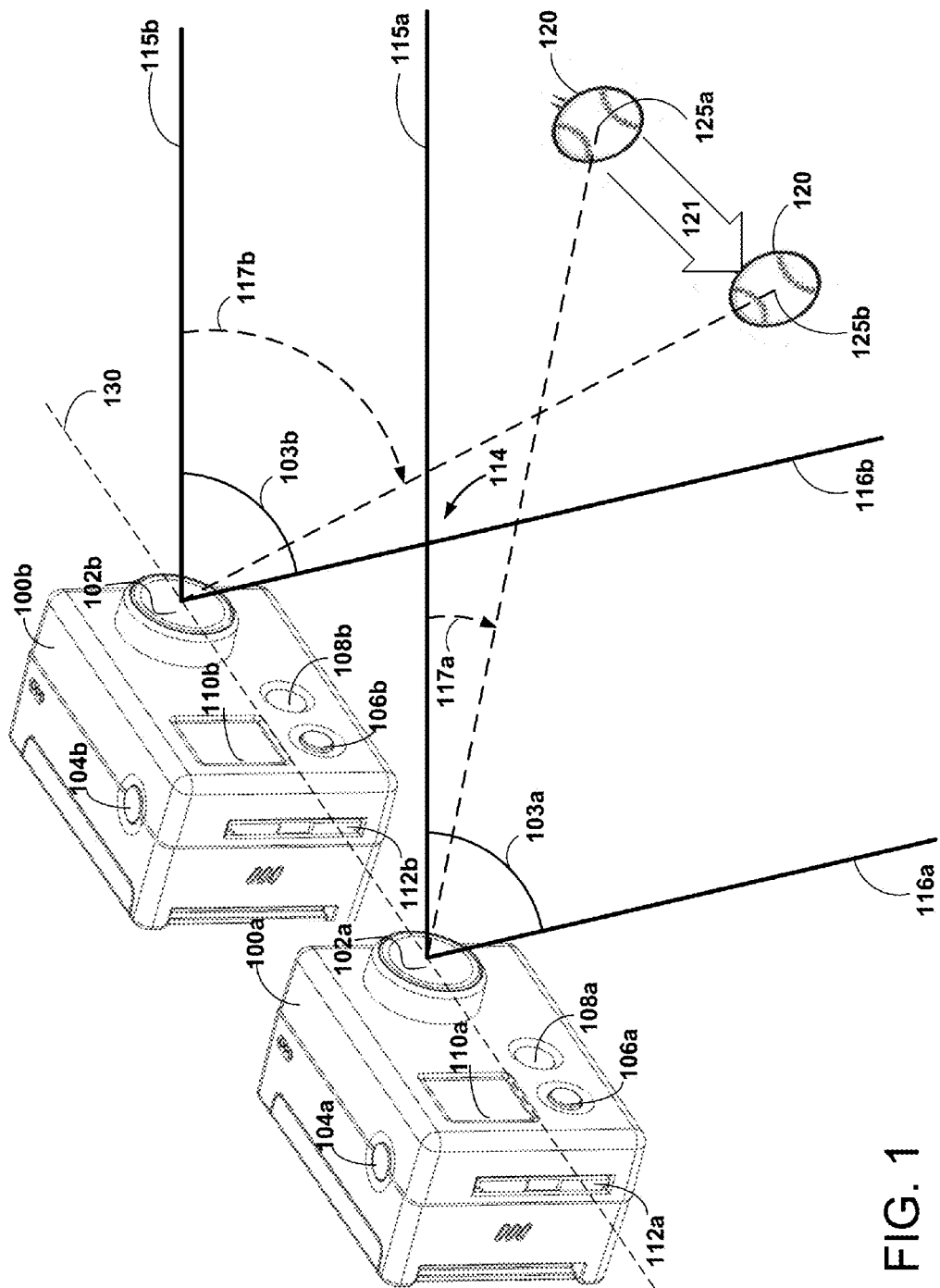
FIG. 1 is a diagram illustrating an example FOV artifact due to overlapping field of views according to one example embodiment.

The Figures (FIGS.) and the following description relate to preferred example embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict example embodiments of the disclosed system (or method) for purposes of illustration only. One skilled in the art will readily recognize from the following description that alternative embodiments of the structures and methods illustrated herein may be employed without departing from the principles described herein.

Overview of Example Embodiments

Example embodiments detailed herein relate to a multi-camera system with opposing and/or converging rolling shutters (RSs) for mitigating overlapping field of view (FOV)

artifacts resulting from camera or object motion during RS image/video frame capture. In order to mitigate FOV artifacts, the multi-camera system includes cameras configured such that a selection of any two adjacent cameras features opposing or converging RSs. The opposing and converging RSs capture image data at the cameras' overlapping FOV at temporally proximate times, thus preventing or significantly reducing time-delay artifacts.

In one example embodiment, the multi-camera system with opposing and/or converging RSs includes a first complementary metal oxide semiconductor (CMOS) image sensor adjacent to a second CMOS image sensor. The first CMOS is associated with a first RS configured to roll in a first direction relative to an orientation of the first CMOS. The second CMOS is associated with a second RS configured to roll in a second direction relative to the first CMOS when the first CMOS and second CMOS are similarly oriented, the second direction opposite the first direction.

In another example embodiment, the multi-camera system with opposing and/or converging RSs includes a first camera adjacent to a second camera. The first camera includes a first RS configured to roll in a first direction relative to an orientation of the first camera. The second camera includes a second RS configured to roll in a second direction relative to the first camera when the first camera and second camera are similarly oriented, the second direction opposite the first direction.

In another example embodiment, the multi-camera system with opposing and/or converging RSs includes an enclosure for orienting a first camera and a second camera, the first camera adjacent to the second camera. The first camera includes a first RS configured to roll in a first direction relative to the orientation of the first camera in the enclosure. The second camera includes a second RS configured to roll in the first direction relative to the first camera when the first camera and second camera are similarly oriented. The orientation of the second camera in the enclosure is configured such that the second RS rolls in a second direction relative to the first RS of the first camera when the first and second camera are positioned in the enclosure, the second direction opposite the first direction.

Example Camera Systems

A multi-camera system comprises two or more (i.e., a plurality of) cameras. In a two-dimensional (2D) operating configuration, each of the plurality of cameras can be used in a conventional standalone manner to capture 2D image data. Furthermore, two or more cameras may be time-synchronized to capture image data in a synchronized manner. Their synchronization allows a user to easily capture temporally identified image data (e.g., tagged key frames or file names) from multiple viewpoints. The synchronous image data from the different cameras is stored and later pieced together based on the temporal information into time-localized video segments (e.g., a scene or cut) or sequences of images from the different cameras to make a continuous-time movie (e.g., using post-processing movie software) or slide show. For 2D panoramic and semi-panoramic imaging, sets of images or video frames captured synchronously (at the same time) may be combined (stitched together) to form a single image or video frame.

In a three-dimensional (3D) operating configuration, two or more cameras are communicatively coupled together (electrically and/or physically) and synchronized such that the captured image data can be overlaid to create 3D images and/or video. The 3D images and video create the illusion of depth thereby providing the 3D effect. Similar to the 2D operating configuration, two or more camera pairs may be time-synchronized to capture image data from multiple 3D perspectives, which is later compiled into a continuous time 3D panoramic movie or slideshow.

In a panoramic or semi-panoramic operating configurations, a plurality of cameras (e.g., two or more cameras) are communicatively coupled together (electrically and/or physically) and synchronized such that the captured images and/or video can be spatially stitched together to create panoramic or semi-panoramic images and/or video (e.g., allowing for up to a 360 degree view). Furthermore, by coupling together a plurality of camera pairs configured for 3D capture (e.g., four or more camera pairs), 3D panoramic and semi-panoramic images and/or video can be created.

In the 2D and 3D configurations described above, one of the cameras of a panoramic camera system (and one of the cameras of each 3D camera pair) may act a master camera and the remaining camera(s) act as slaves. Alternatively, an independent control module (e.g., a non-camera module) may act as the master for the frame synchronization and setting. In this example embodiment, all of the cameras act as slaves. As each camera may be oriented to point to a different direction, the desired setting for each camera to take a good picture may be different. The master (camera or independent control module) sends commands to the slave cameras to configure various settings and synchronize image capture. Each camera sends their settings to the master. The master then defines the appropriate setting for each cameras. Thus, multiple sets of images or video are captured, one from each of the cameras. The camera lenses are positioned such that each camera faces a different direction. For example, in one example embodiment, four cameras are used to capture panoramic images or video with the cameras aligned on a horizontal plane and oriented to 0°, 90°, 180°, and 270° respectively. In another example embodiment, six cameras are used to capture panoramic images with the cameras aligned on a horizontal plane and oriented to 0°, 60°, 120°, 180°, 240°, and 300° respectively. In another example embodiment, a pair of cameras coupled in a 3D capture configuration may be oriented in each direction to capture 3D panoramic images or video. Generally, the captured image/video from each of the cameras at least partially overlaps with the image/video of neighboring cameras. In one example embodiment, captured images or video may be wirelessly streamed to a remote device for storing or live viewing. Using post-processing or real-time image processing software, the images are stitched together to create the panoramic or spherical images or videos.

In one example embodiment, each camera may be programmable to a different operating mode depending on the particular configuration in which it will be used. For example, a user may access a program menu on each camera to select the appropriate camera configuration for each camera. Alternatively, a camera configuration may be set automatically by detecting the configuration of an adjacent camera.

Beneficially, the camera system can be used in a variety of arrangements to capture different types of images and video. Thus, for example, a user may not need to purchase or transport separate cameras for capturing the different aforementioned types of images and video. The configurations as described herein allows for increasing the functional operations available to a user by configuring cameras in a cost effective manner.

By way of example, at an event such as a sporting event, a user owning a set of two cameras, such as those illustrated in FIG. 1, may desire to capture panoramic images of the event. To do so, the user configures the cameras into a panoramic operating configuration and captures synchronous image data of the event. The captured content may be stitched together spatially based on temporal data associated with the captured content in post-processing to create panoramic images and video as desired. However, in various instances, such as action shots, the stitching of images from cameras with overlapping field of views (FOVs) produces undesired artifacts that are often irreconcilable or difficult to reconcile in post processing.

In another example, a user owning four cameras may create two pairs of cameras, each pair configured to collectively capture 3D images. The user may wish to capture 3D panoramic images of the event. To do so, the user configures the cameras into a 3D panoramic operating configuration (e.g., two adjacent 3D configured camera pairs). The captured content from the camera pairs may be stitched together spatially based on temporal data associated with the captured content in post-processing to create 3D panoramic images and video as desired. However, similar to the two-camera panorama, the stitching of image data between the 3D camera pairs with overlapping FOVs produces undesired artifacts that are often irreconcilable in post processing. Thus, in either instance, the overlapping field of view between adjacent 3D camera pairs or adjacent 2D cameras in multi-camera system configurations may result in undesirable overlapping FOV artifacts that cause post processing difficulties.

Example Field of View Artifacts

FIG. 1 is a diagram illustrating an example FOV artifact due to overlapping field of views of two adjacent cameras according to one example embodiment. In some example embodiments, the adjacent cameras 100a and 100b belong to different, but adjacent, 3D camera pairs (paired cameras omitted) which are each configured for capturing synchronized 3D image data. The 3D image data from the camera pairs is stitched together to form 3D panoramic images or video. In other example embodiments, the adjacent cameras 100a and 100b are each configured for capturing synchronized 2D image data which is stitched together to form 2D panoramic images or video.

As shown, each camera 100a, 100b includes a lens 102, a shutter button 104, a function button 106, an indicator light 108, a control display screen 110, and a memory card slot 112. Other conventional camera features not specifically illustrated or described may also be included in camera 100a or camera 100b. For example, each camera 100 may include various optical components, a microphone, speakers, an image and/or audio processor, a controller, internal storage (e.g., flash memory, disk, memory cache or the like), an image preview display screen, input/output ports (e.g., USB, IEEE-1394, Bluetooth, or the like) a communications module (e.g., WiFi or mobile communication such as 3G, 4G, LTE or the like) and other conventional components. Furthermore, each camera 100 may include different or additional control inputs than those illustrated in FIG. 1 for capturing images and/or videos, for viewing previously captured images and/or videos, and for managing various camera settings.

In addition to conventional camera components, each camera 100 may also include a communication interface for communicating with one or more other cameras. The communication interface allows a camera 100 to connect or pair with one or more other cameras via a wired or wireless interface. For example, in the 3D or panoramic operating configuration, two (or more) cameras are coupled via their respective communication interfaces.

Each camera 100 may have one of a variety of format factors. In one example embodiment, each individual camera 100 in the camera system has a small form factor (e.g., a height of approximately 4 to 6 centimeters, a width of approximately 5 to 7 centimeters, and a depth of approximately 2 to 4 centimeters), and is lightweight (e.g., approximately 50 to 150 grams). In other example embodiments, each camera 100 may have any suitable form factor configured to enable the functionalities as described herein.

In the 2D operating configuration, each camera functions like a standalone digital camera. When optionally synchronized, multiple cameras can simultaneously capture video or still images in a time-synchronized manner. In one example embodiment, the cameras communicate using a master/slave (or primary/secondary) configuration in which one camera operates as the master and one more additional cameras operate as slaves. In this configuration, the master camera sends various commands to the slave cameras. For example, the master camera may send a command that instructs each of the slave cameras to capture an image or begin recording video at a particular time (e.g., predefined instance) or at a specific event (e.g., a specific event within the camera such as capture of a first frame of video or other image). Furthermore, the master camera may configure various settings of the slave cameras such as, for example, frame rate, exposure time, resolution, color, and any other operating parameters to ensure that the cameras record video or images using the same setting.

Since each of the cameras may be identical, in one example embodiment, any camera can be configured as either a master or slave (e.g., using a physical switch or a software setting). For video, the cameras are time-synchronized to ensure that each of the synchronized cameras initializes video capture at the same time. Furthermore, for video, the slave camera's clocks are periodically re-synchronized with the master camera's clock in order to re-synchronize the cameras and compensate for potential draft due to different internal camera clock characteristics. In one example embodiment, captured images or video are wireless streamed to a remote device for live viewing. Each camera may also record and store their respective data locally.

As shown in FIG. 1, cameras 100a and 100b are similarly positioned such that the surface of their lenses 102 are substantially coplanar and aligned along line 130 and their top surfaces (denoted by shutter button 104) are coplanar. In other example embodiments, the cameras 100 are rotated (e.g., towards or away from each other) in the plane formed by their top, or side surfaces, such that the lens 102 surfaces are not coplanar. The distance between lenses 102a and 102b along line 130 may also differ depending on the desired application.

Each lens 102 includes a corresponding FOV 103 which denotes the physical area where a camera 100 captures image data. While the FOVs 103 illustrated in FIG. 1 are similar in size for both cameras 100a and 100b, different FOVs may result when there are differing lenses 102 or zoom settings between the cameras.

The edges of camera 100a's FOV 103a are denoted by FOV boundary lines 115a and 116a. Also shown is the RS direction 117a of camera 100a, which exposes the CMOS in the direction of boundary line 115a to 116a. The edges of camera 100b's FOV 103b are similarly shown along with its RS direction 117b, which similarly exposes the CMOS in the direction of boundary line 115b to 116b.

As a result of the positions of cameras 100a and 100b, the field of views 103a, 103b overlap to form region 114. As described above, if the cameras 100 are rotated towards each other or moved closer together, the FOV overlap region 114 increases. While the overlap region 114 decreases if the cameras 100 are rotated away from each other or moved further apart, the image distortion at FOV boundaries 115 and 116 results in other impracticalities for stitching collected image data. In practice, the actual size of the overlap region 114 may be altered based on the user's desired application or equipment qualities (e.g., lens 102 distortion). In either instance, FOV artifacts may occur within the overlap region 114.

To demonstrate an example circumstance producing an FOV artifact, FIG. 1 illustrates an object 120 (e.g., a baseball) moving along path 121 within region 114 during image capture. The baseball 120 is shown at a first position 125a and second position 125b along path 121. It is also recognized that the first position 125a of the baseball 120 corresponds to a first time, t1, during its flight and the second position 125b corresponds to a second time, t2, during the same flight.

Figure 2:
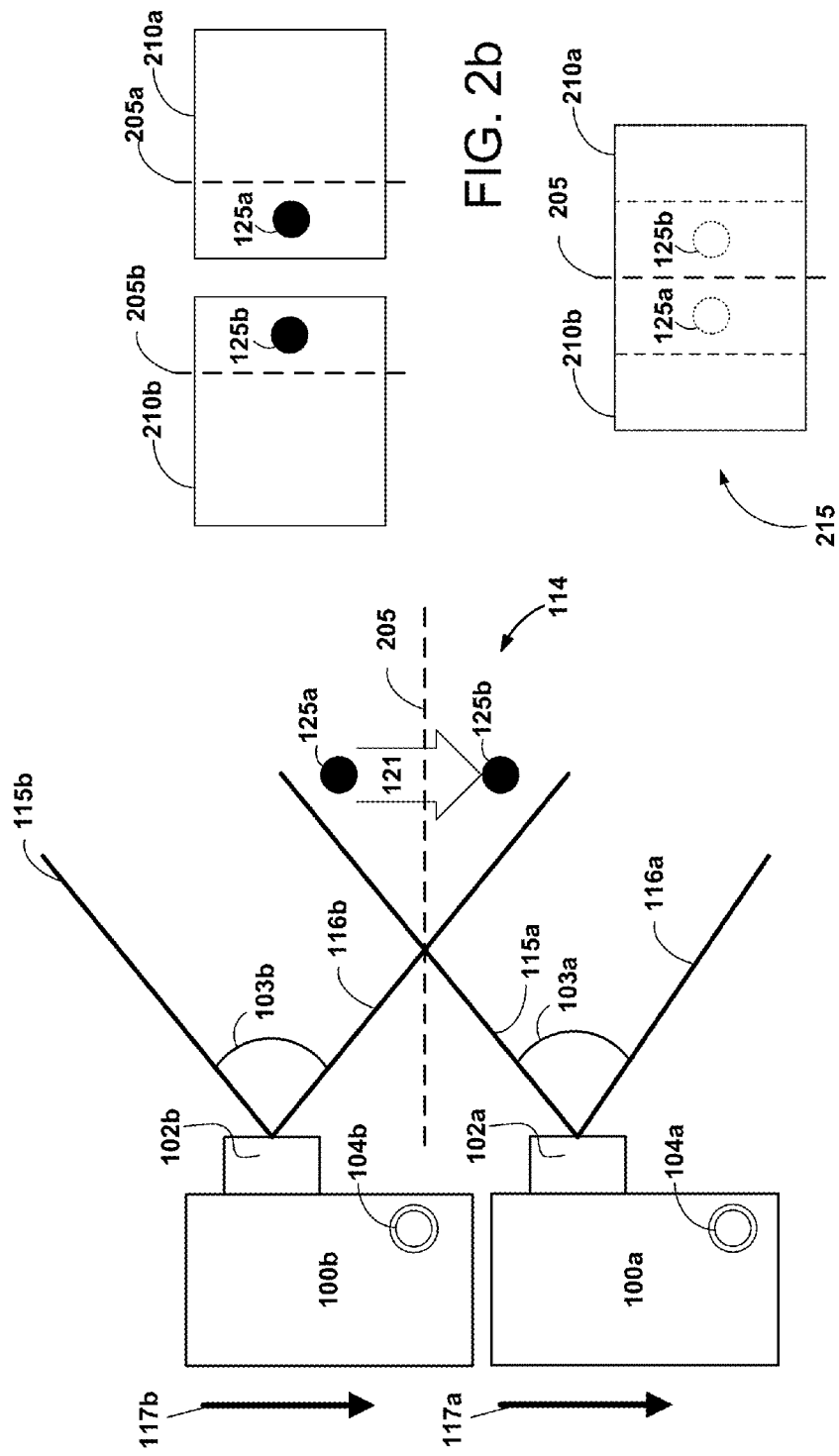
FIG. 2a is a diagram illustrating a top down view of a two camera system capturing image data resulting in FOV artifacts according to one embodiment.
FIG. 2b is a diagram illustrating an image captured from each camera of a two camera system according to one example embodiment.
FIG. 2c is a diagram illustrating stitched image data from a two camera system and a resulting FOV artifact according to one example embodiment.

Each position 125a, 125b also represents the location and time when the respective RS 117a, 117b of a camera 100 encounters the baseball 120 along its flight path. As shown, the RS 117a of camera 100a encounters the baseball 120 at position 125a and the RS 117b of camera 100b encounters the baseball 120 at a later time, at position 125b. In other words, camera 100a "sees" or captures an image of the baseball 120 before camera 100b. Thus, considering the image data collected from both cameras 100, the multi-camera system captures image data of the baseball 120 at two different positions 125a, 125b. The discrepancy in the position 125 of the baseball 120 is an example of a FOV artifact. Oftentimes, these FOV artifacts create significant problems during post-processing. FIGS. 2a through 2c describe example FOV artifacts in greater detail.

FIG. 2a is a diagram illustrating a top down view of a two camera system capturing image data resulting in FOV artifacts according to one example embodiment. In one example embodiment, FIG. 2a illustrates a top down view of two adjacent cameras 100a, 100b in either a 2D or 3D camera pair configuration as described with reference to FIG. 1.

Also shown in FIG. 2a are the RS scan directions 117 of each camera 100. An object's (reference numeral omitted) position 125 and direction 121 (e.g., parallel to the RS 117) are noted within the overlap region 114 of the cameras' 100 FOVs 103a and 103b.

Position 125a corresponds to the object's location when encountered by RS 117a while position 125b corresponds to the object's location when encountered by RS 117b. Because the rolling shutters 117a and 117b are not opposed (or converging), the RSs 117 encounter the object at two separate positions 125a, 125b within the FOV 103 overlap region 114.

FIG. 2a also illustrates an example stitching line 205 where image data from each camera 100 is spliced together to form a single coherent image or video. Typically, in the illustrated configuration, camera 100b supplies the image data above stitching line 205 and camera 100b supplies the image data below. The redundant image data collected by camera 100a between 115a and 205 and by camera 100b between 116b and 205 is omitted from the final image or video during post processing. FIG. 2b illustrates the stitching line 205 with respect to image data captured from camera 100a and 100b.

FIG. 2b is a diagram illustrating an image captured 210 from each camera 100 of a two camera system according to one example embodiment. Image 210a corresponds to the image captured from camera 100a and shows the object at position 125a relative to stitching line 205a. Similarly, image 210b corresponds to the image captured from camera 100b and shows the object at position 125b relative to stitching line 205b. The different positions 125 of the object in the image data 210 create issues when the image data is spliced together.

FIG. 2c is a diagram illustrating stitched image data 215 from a two camera system and a resulting FOV artifact according to one example embodiment. As shown, the stitched image data 215 results from splicing the capture image data 210 at the stitching line 205 by discarding overlapping image data. In the illustrated example, stitching by discarding the overlapping image data in the overlap region 114 results in a final image 215 that does not include the object. While the FOV artifact may be rectified by discarding only one overlap region (e.g., from camera 100b) for this specific example, this requires a manual frame by frame analysis of captured images. Furthermore, moving camera shots or capturing image data of larger moving objects that are not fully encompassed within the overlap region (e.g., are crossing a FOV boundary line 115, 116b forming an overlap region) would still result in FOV artifacts.

Figure 3:
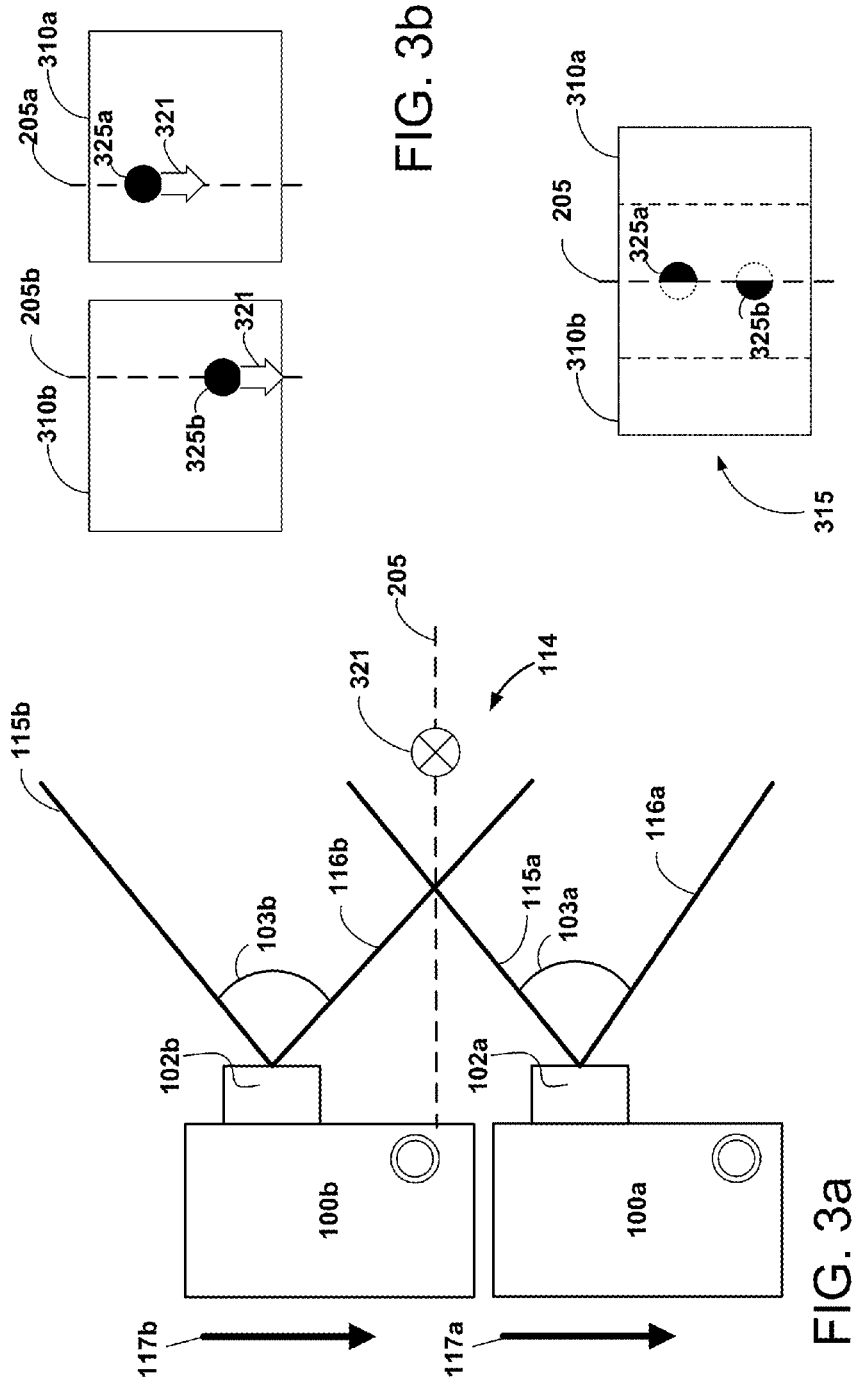
FIG. 3a is a diagram illustrating a top down view of a two camera system capturing image data resulting in FOV artifacts according to one example embodiment.
FIG. 3b is a diagram illustrating an image captured from each camera of a two camera system according to one example embodiment.
FIG. 3c is a diagram illustrating stitched image data from a two camera system and a resulting FOV artifact according to one example embodiment.
Figure 4:
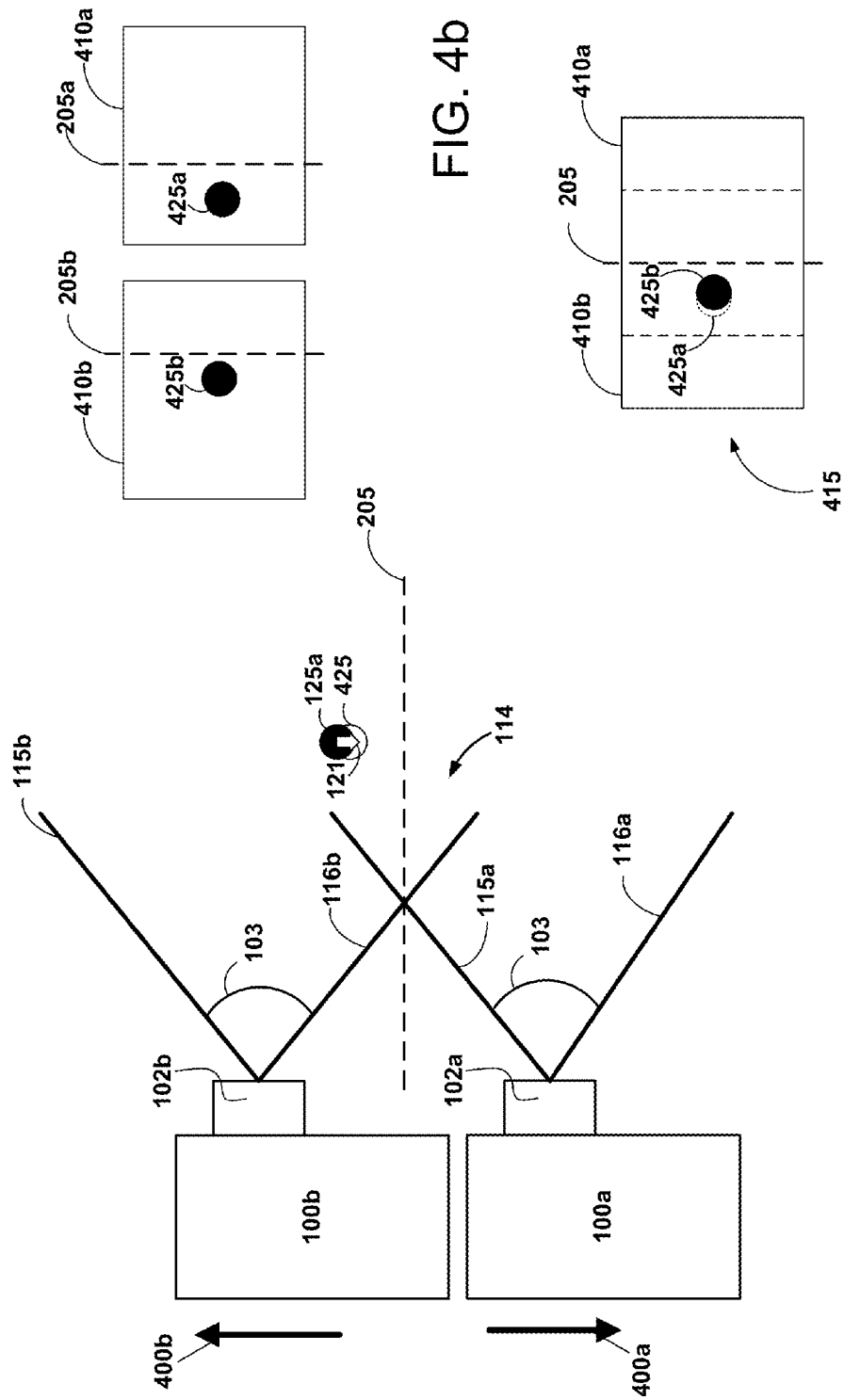
FIG. 4a is a diagram illustrating a top down view of a two camera system for mitigating FOV artifacts according to one example embodiment.
FIG. 4b is a diagram illustrating an image captured from each camera of a two camera system for mitigating FOV artifact according to one example embodiment.
FIG. 4c is a diagram illustrating stitched image data from a two camera system for mitigating FOV artifacts according to one example embodiment.
Figure 5:
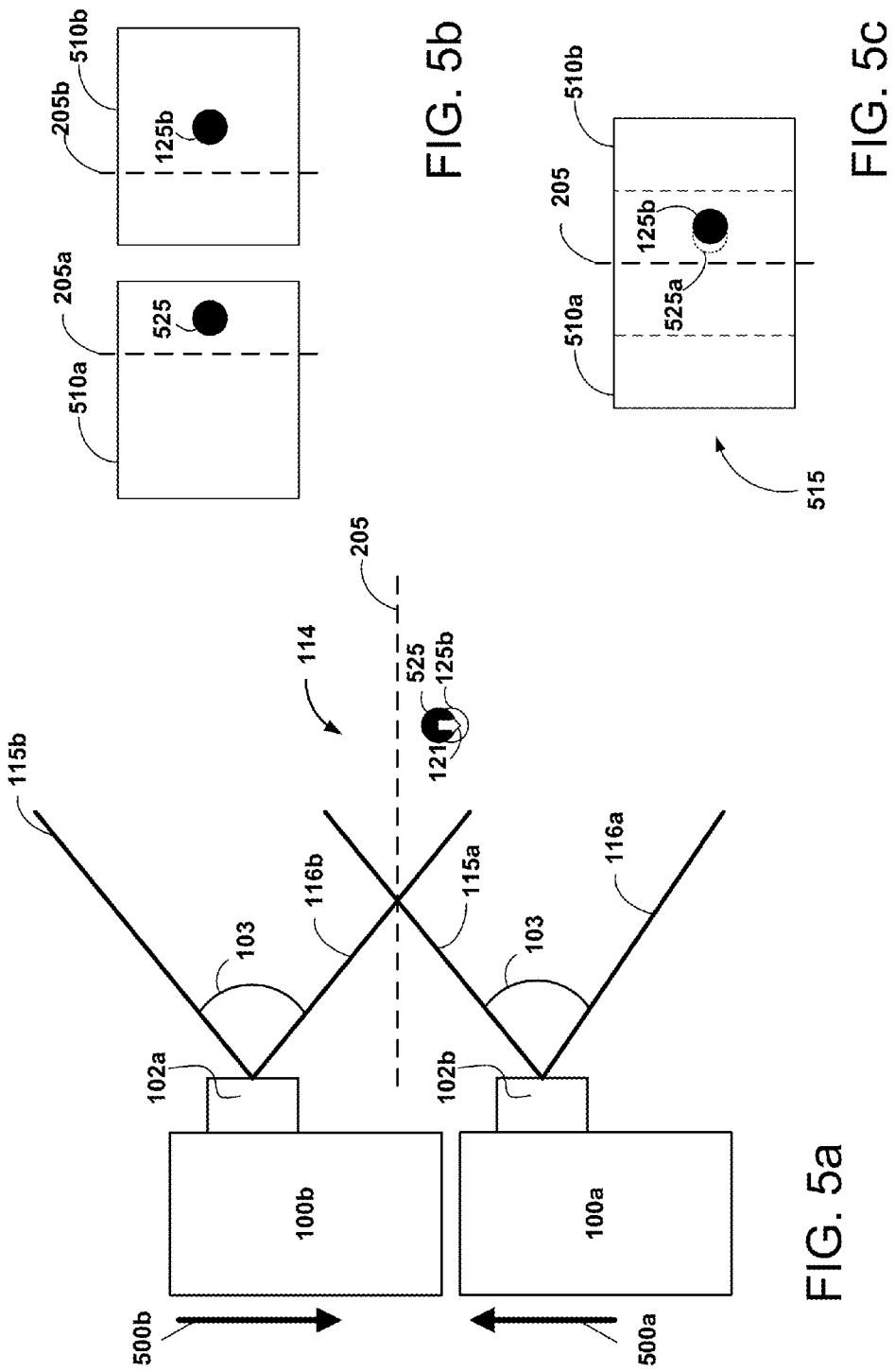
FIG. 5a is a diagram illustrating a top down view of a two camera system for mitigating FOV artifacts according to one example embodiment.
FIG. 5b is a diagram illustrating an image captured from each camera of a two camera system for mitigating FOV artifact according to one example embodiment.
FIG. 5c is a diagram illustrating stitched image data from a two camera system for mitigating FOV artifacts according to one example embodiment.
Figure 6:
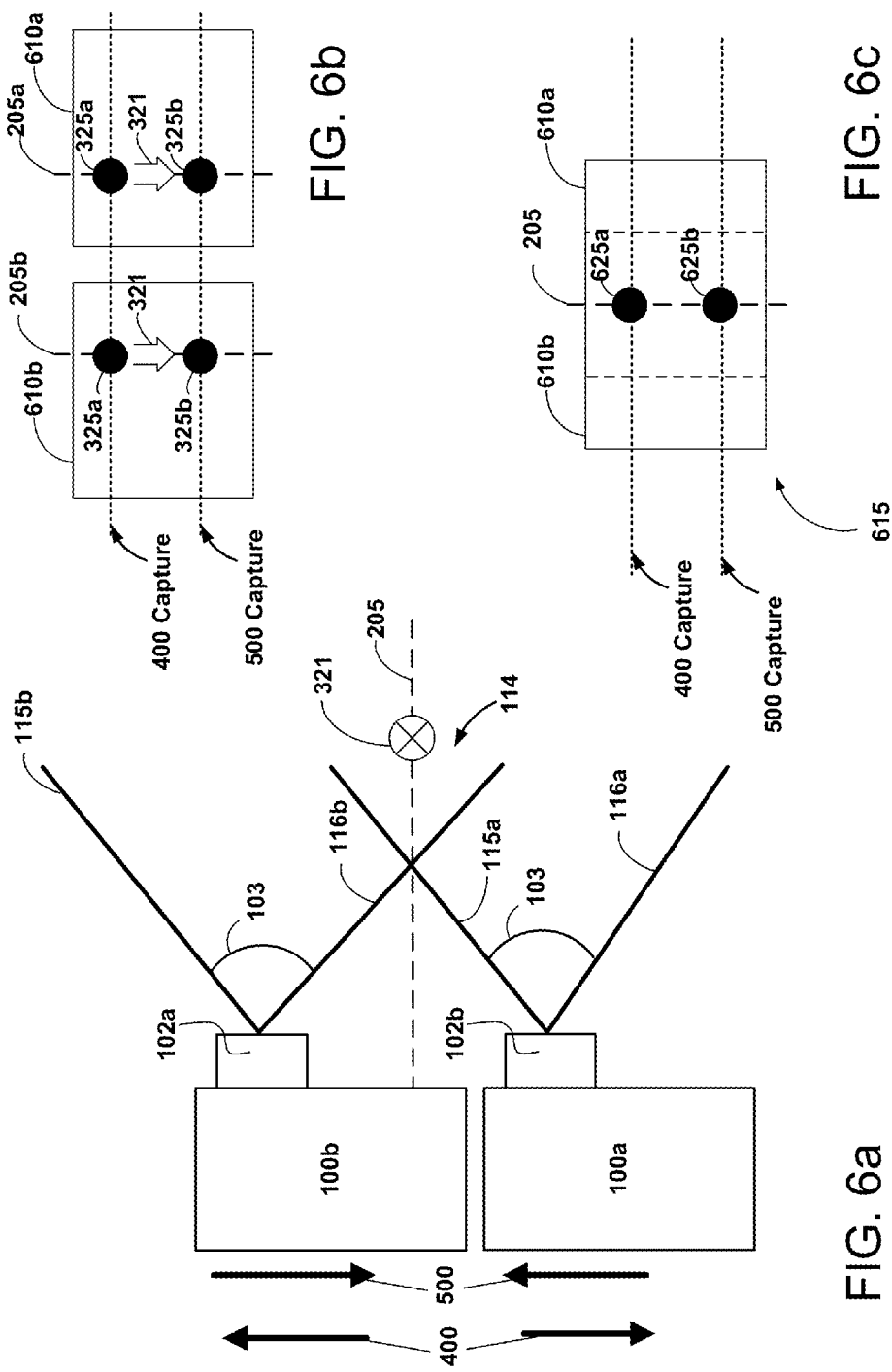
FIG. 6a is a diagram illustrating a top down view of a two camera system for mitigating FOV artifacts according to one example embodiment.
FIG. 6b is a diagram illustrating an image captured from each camera of a two camera system for mitigating FOV artifact according to one example embodiment.
FIG. 6c is a diagram illustrating stitched image data from a two camera system for mitigating FOV artifacts according to one example embodiment.

FIG. 3a is a diagram illustrating a top down view of a two camera system capturing image data resulting in FOV artifacts according to one example embodiment. In one example embodiment, FIG. 3a illustrates a top down view of two adjacent cameras 100a, 100b in either a 2D or 3D camera pair configuration as described with reference to FIG. 1. Also shown in FIG. 3a are the RS scan directions 117 of each camera 100 and a direction of movement 321 into the page within the overlap region 114. In one example embodiment, the direction of movement 321 (e.g., perpendicular to the RS 117) corresponds to an object capture in the image data that appears on both sides of a stitching line 205. Alternatively, the camera system may be moving with or opposite the direction of movement to produce a FOV artifact.

FIG. 3a also illustrates an example stitching line 205 where image data from each camera 100 is spliced together to form a single coherent image or video. Typically, in the illustrated configuration, camera 100b supplies the image data above stitching line 205 and camera 100b supplies the image data below. The redundant image data collected by camera 100a between 115a and 205 and by camera 100b between 116b and 205 is omitted from the final image or video during post processing. FIG. 3b illustrates the stitching line 205 with respect to image data captured from camera 100a and 100b.

FIG. 3b is a diagram illustrating an image captured 310 from each camera of a two camera system according to one example embodiment. Image 310a corresponds to the image captured from camera 100a and shows an object moving in the direction of travel 321 at position 325a relative to stitching line 205a (i.e. with a portion on either side at position 325a). Similarly, image 210b corresponds to the image captured from camera 100b and shows the same object moving in the direction of travel 321 at position 325b relative to stitching line 205b. The different positions 325 of the object in the image data 210 create issues when the image data is spliced together.

FIG. 3c is a diagram illustrating stitched image data 315 from a two camera system and a resulting FOV artifact according to one example embodiment. As shown, the stitched image data 315 results from splicing the images 310 at the stitching line 205 by discarding overlapping image data. In the illustrated example, stitching by discarding the overlapping image data in the overlap region 114 results in a final image 315 that includes portions of the object at the respective positions 325a, 325b, where the RSs 117 captured the image data. While the FOV artifact may be rectified by discarding only one overlap region (e.g., from camera 100b) for this specific example, this requires a manual frame by frame analysis of captured images. Furthermore, moving camera shots or capturing image data of larger moving objects that are not fully encompassed within the overlap region (e.g., are crossing a FOV boundary line 115, 116b forming an overlap region) would still result in FOV artifacts.

Example Camera Configurations for Mitigating FOV Artifacts

FIGS. 4 through 8 illustrate example embodiments of a camera system for mitigating FOV artifacts. The cameras and camera systems discussed with reference to those figures may include configurable RSs. Alternatively, one or more cameras may include an RS configured to roll in a direction different than that of another camera. Furthermore, example embodiments include systems of two or more cameras with the same RS direction but different camera orientations for changing—relative to another camera—the RS directions of the camera system.

Additionally, one or more of the illustrated example embodiments includes a camera housing for orienting (e.g., to change the RS direction or position the camera) or protecting one or more cameras. The housing may be, for example, a clear rigid housing structured to secure two or more cameras. The housing may be structured such that the FOV overlap region between two adjacent cameras whose image data will be stitched is reduced. Furthermore, the housing may be structured such that when a camera pair is inserted into the housing, the camera lenses are positioned at an appropriate distance for capture of 3D images and/or video.

In the 2D and 3D panoramic operating configuration, a housing or mounting structure may be used that is structured such that when the cameras are inserted into the housing or mounting structure, the camera lenses are positioned at appropriate distances for capturing panoramic (and/or 3D panoramic) images and video. In one example embodiment, the camera housing is rigid (or substantially rigid) (e.g., plastic, metal, fiberglass, etc.) In one example embodiment, the camera housing may be appropriately configured for use in various operating conditions. For example, the camera housing may comprise a waterproof enclosure that protects the camera from water when used, for example, while surfing or scuba diving. Furthermore, an electrical backbone may be built into the mounting structure such that when the cameras are physically connected to the structure, the appropriate electrical connections are made for synchronizing the cameras for panoramic and/or 3D image or video capture.

Furthermore, one or more of the cameras in a camera system can be configured to operate in either an upright mode or an upside-down mode relative to a top of the camera (e.g., where the shutter button 104 is located). In the upright mode (e.g., shutter button 104 facing upward in the example camera 100 configuration illustrated in FIG. 1), the orientation of the captured images/video matches what a user would see through the viewfinder (i.e., the orientation is not flipped). In the upside down mode (e.g., the side opposite the shutter button facing upward and the side having the shutter button 104 is facing downward), the stored image/video is flipped about the horizontal axis (i.e., upside down relative to what a user would see through the viewfinder). This allows the camera 100 to capture images and/or video that is properly oriented even when the user turns the camera upside down.

Additional embodiments include a synchronization interface for synchronizing camera functions such as a rolling shutter. The synchronization interface may also configure variable RSs to roll in a specific direction (e.g., towards or away from an overlap region 114). For capturing still images, the synchronization interface coordinates the synchronous capture of image data by instructing the cameras to roll the RSs at the same time and speed. For capturing live video, the synchronization interface instructs the cameras to roll the RSs at the same time and speed and monitors the RS scanning of all cameras in the system. If the RSs corresponding to an overlapping FOV fall out of sync, the synchronization interface resynchronizes the RSs (e.g., skipping a frame or adjusting RS speed). If a frame is skipped, the last or next frame may be duplicated and the RSs restarted. The synchronization interface may be built into a master camera or an electrical backbone of a housing, or may be provided by an external device.

FIG. 4a is a diagram illustrating a top down view of a two camera system for mitigating FOV artifacts according to one example embodiment. In one example embodiment, FIG. 4a illustrates a top down view of any two adjacent cameras 100a, 100b in a 2D camera configuration. In other example embodiments, FIG. 4a illustrates a top down view of any two adjacent cameras of separate 3D camera pairs (e.g., with each camera pair having the same RS direction) in a 3D panoramic configuration. Also shown in FIG. 4a is an opposing RS scan configuration 400 of the camera system. The RS direction 400a of camera 100a is configured to scan from FOV boundary 115a to 116a and the RS direction 400b of camera 100b is configured to scan—in the opposite direction of 400a—from FOV boundary 116b to 115b. By configuring the RS scan directions 400 in this manner, FOV artifacts may be reduced as the cameras 100 see or capture image data 410 in the overlap region 114 temporally proximate to each other (e.g., at nearly the same time).

FIG. 4a also illustrates an object traveling in direction 121. Position 125a corresponds to the object's location when encountered by RS 400a (e.g., RS 117a in FIG. 2a for the same object) while position 425b corresponds to the object's location when encountered by RS 400b. While the RSs 400 still capture the object at two separate positions 125a, 425b, the change in the object's position in the overlap region 114 is greatly reduced. Accordingly, the object is less likely to appear on the other side of the stitching line 205 and produce a FOV artifact.

For object positions approaching the stitching line 205, the distance between the first and second captures is further reduced. Additionally, the RSs 400 configuration enables the cameras 100 to capture image data along the stitching line 205 at the same instant. For objects crossing the stitching line 205 (or camera movement) at the moment of capture, the synchronized capture of image data at the stitching line 205 results in the same cross section of the object (or background) captured in the image data 410 at the stitching line by both cameras 100. Thus, when the collected image data from each camera 100 is spliced at the stitching line 205, object movement (e.g., in direction 121) and camera movement does not result in FOV artifacts.

FIG. 4b is a diagram illustrating an image captured 410 from each camera 100 of a two camera system for mitigating FOV artifacts according to one example embodiment. Image data 410a corresponds to the image captured from camera 100a and shows the object at position 125a relative to the stitching line 205a. Similarly, image 510b corresponds to the image captured from camera 100b and shows the object at position 425 relative to stitching line 205b.

For illustrative purposes, assume that the images captured in FIG. 2b and FIG. 4b are of the same object but with different camera systems (e.g., the camera systems in FIG. 2a and FIG. 4a, respectively). Compared to captured images 210 which show the object in drastically different positions 125a, 125b, captures 410a, 410b show the object in substantially the same position 125a, 425 due to RS 400b rolling in the opposite direction of RS 400a. While an actual measured distance between position 125a and 125b or 425 directly depends on object speed and RS speed, with substantially the same object and RS speed, the RS 400 configuration of FIG. 4a will reduce the distance from 125a to the second object position 425 compared with the configuration of FIG. 2a. For a sufficiently fast RS 400, the camera configuration in FIG. 4a substantially eliminates FOV artifacts within the overlap region 114.

Furthermore, as the distance between the object positions 125, 425 decreases to zero at the stitching line 205, an object crossing the stitching line will have substantially the same cross section at 205a and 205b. Similarly, for moving cameras 100, the background at the stitching line 205 will be substantially identical. Thus, when captured images (not shown) in these scenarios are stitched, image data of the object and/or background at the stitching line 205 is substantially aligned, therefore reducing FOV artifacts.

FIG. 4c is a diagram illustrating stitched image data 415 from a two camera system for mitigating FOV artifacts according to one example embodiment. As shown, the stitched image data 415 results from splicing the captured image data 410 at the stitching line 205 by discarding overlapping image data. In the illustrated example, stitching by discarding the overlapping image data does not result in a FOV artifact as the object does not cross the stitching line 205. Furthermore, because the distance from the first object position 125a to the second object position 425 reduces to zero for the cross section at the stitching line 205, the stitching 415 of collected image data 410 can be automated.

FIG. 5a is a diagram illustrating a top down view of a two camera system for mitigating FOV artifacts according to one example embodiment. In one example embodiment, FIG. 5a illustrates a top down view of any two adjacent cameras 100a, 100b in a 2D camera configuration. In other example embodiments, FIG. 5a illustrates a top down view of any two adjacent cameras of separate 3D camera pairs (e.g., with each camera pair having the same RS direction) in a 3D panoramic configuration. Also shown in FIG. 5a is an opposing RS scan configuration 500 of the camera system. The RS direction 500a of camera 100a is configured to scan from FOV boundary 116a to 115a and the RS direction 500b of camera 100b is configured to scan—in the opposite direction of 500a—from FOV boundary 115b to 116b. By configuring the RS scan directions 500 in this manner, FOV artifacts may be reduced as the cameras 100 see or capture image data 510 in the overlap region 114 temporally proximate to each other.

FIG. 5a also illustrates an object traveling in direction 121. Position 525 corresponds to the object's location when encountered by RS 500a while position 125b corresponds to the object's location when encountered by RS 500b (e.g., RS 117b in FIG. 2a for the same object). While the RSs 500 still capture the object at two separate positions 525, 125b, the change in the objects position in the overlap region 114 is greatly reduced. Accordingly, the object is less likely to appear on the other side of the stitching line 205 and produce a FOV artifact.

For object positions closer to the stitching line 205, the distance between the first and second captures is further reduced. Additionally, along the stitching line 205, the RSs 500 cause the cameras 100 to capture image data at the same instant. For objects crossing the stitching line 205 (or camera movement) at the moment of capture, the synchronized capture of image data at the stitching line 205 results in the same cross section of the object (or background) captured in the image data 510 at the stitching line by both cameras 100. Thus, when the image data from the cameras 100 are spliced at the stitching line 205, object movement (e.g., in direction 121) and camera movement will not result in FOV artifacts.

FIG. 5b is a diagram illustrating an image captured 510 from each camera 100 of a two camera system for mitigating FOV artifacts according to one example embodiment. Image data 510a corresponds to the image captured from camera 100a and shows the object at position 525 relative to the stitching line 205a. Similarly, image 510b corresponds to the image captured from camera 100b and shows the object at position 125b relative to stitching line 205b.

For illustrative purposes, assume that the images captured in FIG. 2b and FIG. 5b are of the same object but with different camera systems (e.g., the camera systems in FIG. 2a and FIG. 5a, respectively). Compared to captured images 210 which show the object in drastically different positions 125a, 125b, configuration of RS 500b in the opposite direction of 500a results in captures 510a, 510b that show the object in substantially the same position 525, 125b. While an actual measured distance between the positions directly depends on object speed and RS speed, with substantially the same object and RS speed, the RS 500 configuration of FIG. 5a will reduce the distance from 525 to the second object position 125b compared with the configuration of FIG. 2a. For a sufficiently fast RS 500, the camera configuration in FIG. 5a substantially eliminates FOV artifacts within the overlap region 114.

Furthermore, as the distance between the object positions 525, 125b decreases to zero at the stitching line 205, an object crossing the stitching line will have substantially the same cross section at 205a and 205b. Similarly, for moving cameras 100, the background at the stitching line will be substantially identical. Thus, when captured images (not shown) in these scenarios are stitched, image data of the object and/or background at the stitching line 205 is substantially aligned, therefore reducing FOV artifacts.

FIG. 5c is a diagram illustrating stitched image data 515 from a two camera system for mitigating FOV artifacts according to one example embodiment. As shown, the stitched image data 515 results from splicing the captured image data 510 at the stitching line 205 by discarding overlapping image data. In the illustrated example, stitching by discarding the overlapping image data does not result in a FOV artifact as the object does not cross the stitching line 205. Furthermore, because the distance from the first object position 525 to the second object position 125b reduces to zero for the cross section at the stitching line 205, the stitching 515 of collected image data 510 can be automated.

FIG. 6a is a diagram illustrating a top down view of a two camera system for mitigating FOV artifacts according to one example embodiment. In one example embodiment, FIG. 6a illustrates a top down view of any two adjacent cameras 100a, 100b in a 2D camera configuration. In other example embodiments, FIG. 6a illustrates a top down view of any two adjacent cameras of separate 3D camera pairs (e.g., with each camera pair having the same RS direction) in a 3D panoramic configuration.

Also shown in FIG. 6a are two example RS scan directions 400, 500 for each camera 100 and a direction of movement 321 into the page within the overlap region 114. In one example embodiment, the direction of movement 321 (e.g., perpendicular to the RSs 400, 500) corresponds to an object capture in the image data that appears on both sides of a stitching line 205. Alternatively, the camera system may be moving with or opposite the direction of movement. By configuring the RS scan directions 400, 500 in this manner, FOV artifacts are greatly reduced as the cameras 100 see or capture image data 510 in the overlap region 114 temporally proximate to each other.

FIG. 6b is a diagram illustrating an image captured 610 from each camera of a two camera system for mitigating FOV artifact according to one example embodiment. Image 610a corresponds to an image captured from camera 100a for RS direction 400 or RS direction 500 and shows an object moving in the direction of travel 321. For RS direction 400, image 610a shows the object at position 325a relative to stitching line 205a (i.e. with a portion on either side) and at position 325b for RS direction 500. Similarly, for RS direction 400, image 610b shows the object at position 325a relative to stitching line 205b (i.e. with a portion on either side) and at position 325b for RS direction 500. Because the RSs 400, 500 capture image data at the stitching line 205 at the same instant, the position 625a, 625b of the object in each image capture 610 for the respective RS configuration (e.g., RS 400 for position 625a) is substantially the same.

FIG. 6c is a diagram illustrating stitched image data from a two camera system for mitigating FOV artifacts according to one example embodiment. As shown, the stitched image data 615 results from splicing the captured image data 610 at the stitching line 205 by discarding overlapping image data. In the illustrated example, stitching by discarding the overlapping image data in the overlap region 114 results in a final image 615 with the object in position 625a for cameras 100 with RS configuration 400 and position 625b for cameras with RS configuration 500, with mitigated FOV artifacts.

Figure 7:
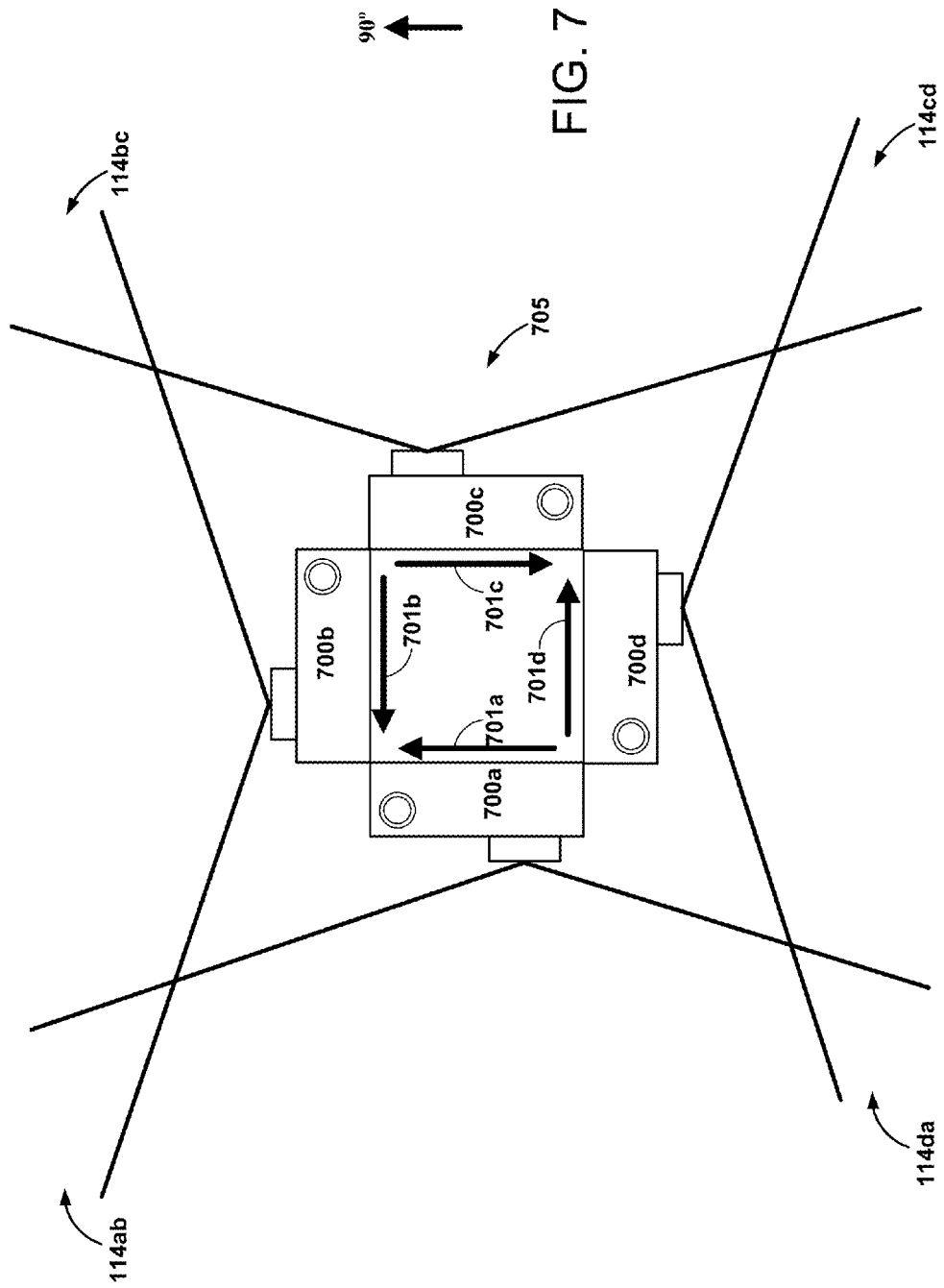
FIG. 7 is a diagram illustrating a top down view of an example four camera system for mitigating FOV artifacts according to one example embodiment.

FIG. 7 is a diagram illustrating a top down view of an example four camera system 705 for mitigating FOV artifacts according to one example embodiment. The four camera system 705 includes cameras 700a through 700d that are respectively oriented 0°, 90°, 180°, and 270° to capture 360 degree 2D panoramic images. Each camera 100 includes a corresponding RS direction 701 for mitigating FOV artifacts when collected image data is stitched together. In one example embodiment, the RS direction 701 of one or more cameras 700 is user configurable. Alternatively, cameras 700a and 700c have a RS direction 701a, 701c configured to roll in the opposite direction of the RSs 701b, 701d of cameras 700b and 700d.

As shown in FIG. 7, any two adjacent cameras 700 have an overlapping FOV region 114. In order to mitigate FOV artifacts in the overlap regions 114, the RSs 701 of any two adjacent cameras 700 in the system 705 are configured to both roll towards or away from the overlap region 114. For example, the RSs 701a, 701b of adjacent cameras 700a, 700b are configured to roll towards their FOV overlap region 114ab. Similarly, the RSs 701c, 701d of cameras 700c, 700d are configured to roll towards their FOV overlap region 114cd. Consequently, the RSs 701b, 701c and 701a, 701d of the other adjacent cameras 700 roll away from overlap regions 114bc and 114da to also prevent FOV artifacts.

FOV artifacts are mitigated in each overlap region 114 as a result of the illustrated RS configuration to enable seamless stitching of image data collected from all cameras in the system 705. Other example embodiments can include additional cameras 700 and/or different camera orientations as long as each RS 701 corresponding to an overlap region 114 where image data will be stitched are configured to roll towards or away from the overlap region.

Furthermore, example embodiments include a camera housing for orienting cameras 700a though 700d as shown in FIG. 7. In one embodiment, the cameras 700 are dimensionally similar and oriented right side up as denoted by respective shutter buttons (not shown). The camera housing orients the cameras at the 0°, 90°, 180°, and 270° positions and provides communicative coupling to the cameras 700. One or more of the cameras may operate as a master camera to synchronize capture of image data. Alternatively, the housing itself may include a synchronization device for communicating directly with the cameras 700. The housing may be configured to securely enclose each camera, and may include one or more doors configured to open and close and allowing for the insertion and removal of the cameras into and from the housing.

Figure 8:
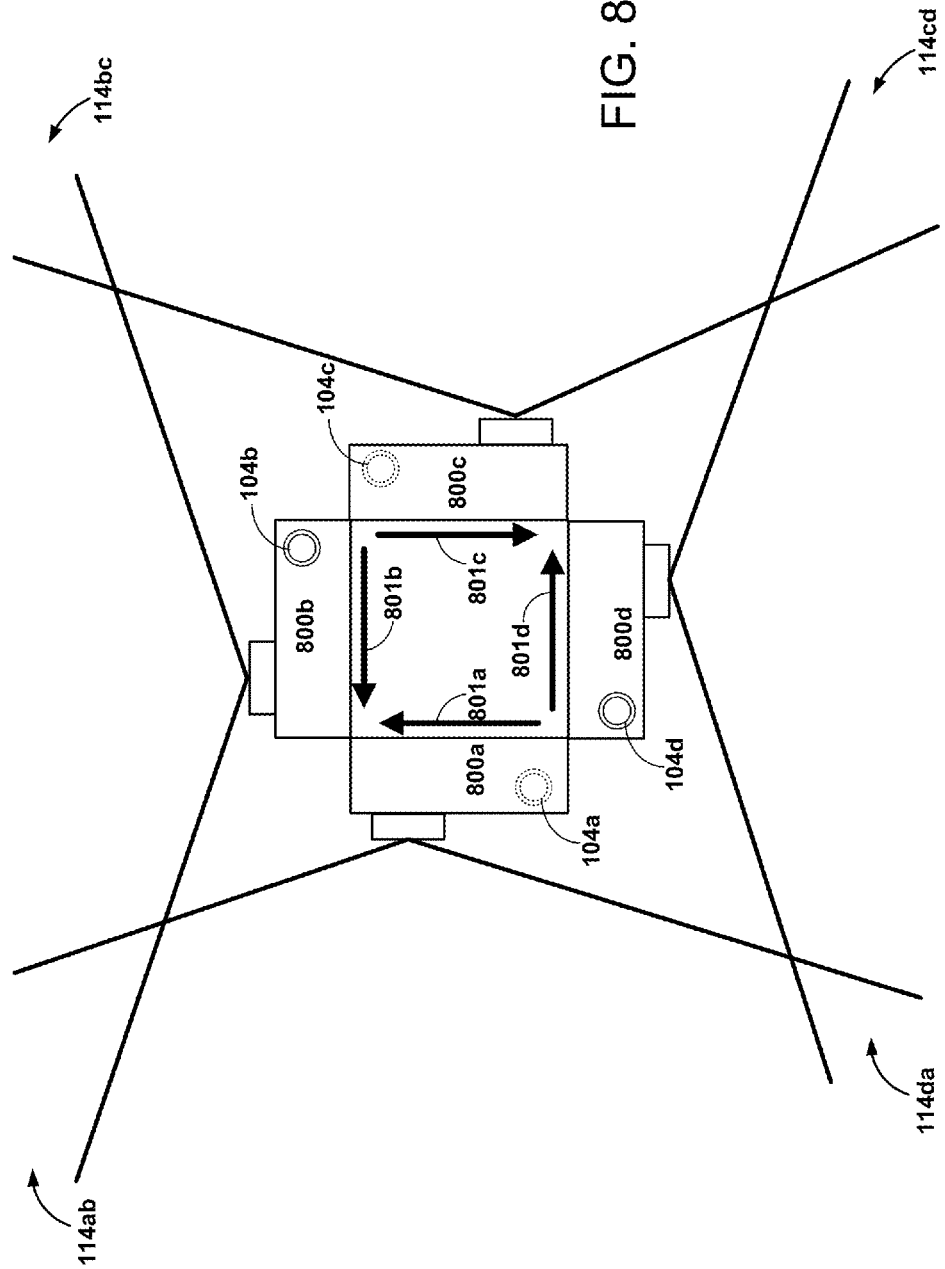
FIG. 8 is a diagram illustrating a top down view of another example four camera system for mitigating FOV artifacts according to one example embodiment.

FIG. 8 is a diagram illustrating a top down view of another example four camera 805 system for mitigating FOV artifacts according to one example embodiment. The four camera system 805 includes cameras 800a through 800d that are respectively oriented 0°, 90°, 180°, and 270° to capture 360 degree 2D panoramic images. Each camera 100 includes a corresponding RS direction 701 for mitigating FOV artifacts when collected image data is stitched together.

Similar to FIG. 7, FIG. 8 also shows that any two adjacent cameras 800 with an overlapping FOV region 114 have RSs 801 that either roll towards or away from the overlap region. In contrast, however, the example embodiment of FIG. 8 shows cameras 800a and 800c oriented upside down as denoted by the outlines of their shutter buttons 104a, 104c. Cameras 800b and 800d are oriented right side up. By orienting the cameras 800 as shown in FIG. 8, the RS configuration mitigates FOV artifacts in each overlap region 114.

Furthermore, example embodiments include a camera housing for orienting cameras 800a though 800d as shown in FIG. 8. In one embodiment, the cameras 800 are dimensionally similar and oriented right side up or upside down as denoted by respective shutter buttons 104a. Orienting the cameras 800 in this manner ensures the appropriate RS configuration for cameras having the same RS roll direction. The camera housing alternately orients the cameras 800 between right side up and upside down at the 0°, 90°, 180°, and 270° positions and provides communicative coupling to the cameras. One or more of the cameras 800 may operate as a master camera to synchronize the capture of image data. Alternatively, the housing itself may include a synchronization device for communicating directly with the cameras 800. The housing may be configured to securely enclose each camera, and may include one or more doors configured to open and close and allowing for the insertion and removal of the cameras into and from the housing.

Other example embodiments include camera systems and housings of 3D camera pairs respectively oriented to capture 3D panoramic images. For example, four camera pairs (eight cameras total) respectively oriented at 0°, 90°, 180°, and 270° may be used to capture 360-degree 3D panoramic images. Similar to the cameras 700, 800 with overlapping FOV regions 114 shown in FIGS. 7 and 8, adjacent 3D camera pairs have similar FOV overlap regions. To mitigate FOV artifacts, the RSs of all four cameras in adjacent 3D camera pairs are configured to either roll towards or away from the overlap region.

Example embodiments of a 3D panoramic housing may include attachments for two or more 3D camera pairs and a synchronization interface. In one embodiment, the synchronization interface communicates with a master camera of each 3D camera pair to specify RS configurations and/or settings for the cameras. During image capture, the synchronization interface receives data from the individual master cameras and determines settings for each 3D camera pair in the 3D panoramic system.

Figure 9:
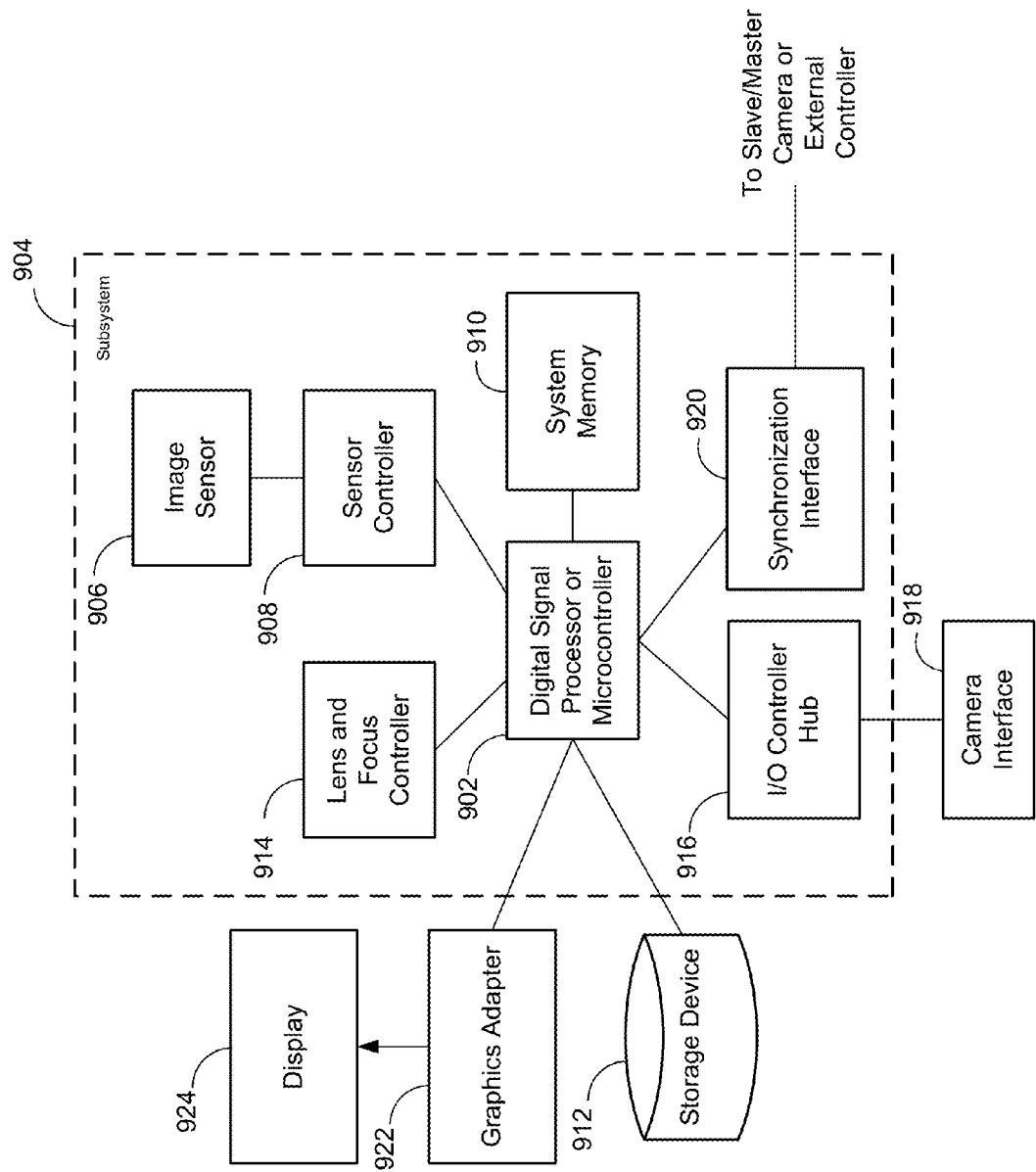
FIG. 9 is a diagram illustrating a camera subsystem for use in a camera for mitigating FOV artifacts according to one example embodiment

FIG. 9 is a diagram illustrating a camera subsystem 904 for use in a camera 100 for mitigating FOV artifacts according to one example embodiment. Illustrated are at least one digital signal processor (DSP) (or microcontroller) 902 within a subsystem 904 of a camera 100. The DSP manages operations of the camera 100 and processes data collected by the image sensor 906. The image sensor 906 converts light into analog electrical signals and, depending on the embodiment, may use a charge coupled device (CCD) or CMOS sensor to produce the electrical signals. A sensor controller 908 coupled to the image sensor 906 manages collection of image data at the sensor.

In example embodiments where the image sensor 906 comprises a CMOS sensor, the sensor controller 908 may operate a rolling shutter in conjunction with the collection of image data at the sensor. Further, in some example embodiments, the sensor controller 908 may roll a direction-configurable rolling shutter in a given direction responsive to signals received from the DSP 902.

The sensor controller 908 receives analog signals from the image sensory 906 and converts the analog signals into digital signals. The digital signals, in turn, are passed to the DSP 902 which stores them in system memory 910. The system memory 910 holds instructions and data used by the DSP 902. Typically, the system memory 910 comprises a portion of random-access memory for temporary storage (e.g., buffering) of image data prior to processing carried out by the DSP 902 and transfer to a storage device 912. Other portions of the system memory 910 may be nonvolatile and store settings, firmware and other data for camera operations.

The storage device 912 is a non-transitory computer-readable storage medium such as a hard drive, writable optical disk or a solid-state memory device. The storage device 912 is typically removable and embodied as a memory card.

Example embodiments of the subsystem 904 also include a lens and focus controller 914 coupled to the DSP 902. The lens and focus controller 914 operates components of the camera such as lens zoom and lens focus via associated motor drives and other hardware or sensors used in associated with collection of image data from the image sensor 906.

The subsystem 904 also includes an input/output (I/O) controller hub 916 and a synchronization interface 920. Camera interface 918 elements such as shutter button 104, function button 106, indicator light 108 and the like that enable users to physically operate a camera 100 are coupled to the I/O controller hub 916. The synchronization interface 920 receives and/or communicates settings to other cameras and/or an external control device for synchronizing camera functions and settings. For example, the interface 920 may be used to synchronize image collection in general and more specifically to synchronize roll of rolling shutters to mitigate FOV artifacts. The interface 920 may also receive or communicate data for appropriately tagging frames across multiple cameras to enable temporal stitching and playback of 2D and 3D image data. Furthermore, the interface 920 may be coupled to an electrical backbone built into a mounting structure for making electrical connections with a control device and/or other cameras.

The graphics adapter 922 displays images and other information on the display device 924. In some embodiments, the display device 924 includes touch screen capability for receiving user input and selections. In the case of a touch-screen display 924, user inputs may also be communicated to the I/O controller hub 916 and/or a graphics adapter 922 supporting the display. Additionally, the display 924 itself may be a physical component of the camera 100 (e.g., live-preview display/viewfinder) or standalone component coupled to the camera (e.g., television or monitor).

Other example embodiments of the camera subsystem 904 have different architectures. For example, the system memory 910 may be directly coupled to the sensor controller 908 for receiving digital image data. Other camera 100 components (not shown) coupled to the DSP 902, I/O controller hub 916 or synchronization interface 920 may include a microphone, speakers, additional input/output ports (e.g., USB, IEEE-1394, Bluetooth, RJ45 or the like), GPS, a wireless communications module (e.g., WiFi or mobile communication such as 3G, 4G, LTE or the like) or other conventional components.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one example embodiment" or "an example embodiment" means that a particular element, feature, structure, or characteristic described in connection with the embodiment is included in at least one embodiment. The appearances of the phrase "in one example embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a modular configurable camera system as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope.

The invention claimed is:

1. A multi-camera system for mitigating field of view (FOV) artifacts in 360-degree imaging, the multi-camera system comprising:
   a plurality of cameras, each camera having a rolling shutter for enabling the capture of panoramic image data from a field of view of the camera;

a first camera pair comprising a first camera positioned opposite a second camera, the first camera and the second camera oriented to face outwards in substantially opposite directions;

a second camera pair comprising a third camera positioned opposite a fourth camera, the third camera and the fourth camera oriented to face outwards in substantially opposite directions, wherein the first camera pair and the second camera pair are oriented to face outwards in substantially perpendicular directions where at least a portion of the field of view of the third camera overlaps a portion of the field of view of the first camera to form an overlap region;

a first rolling shutter and a second rolling shutter of the first camera pair configured to roll in substantially opposite directions; and a third rolling shutter and a fourth rolling shutter of the second camera pair configured to roll in substantially opposite directions;

wherein the first camera is configured to configure the first camera, the second camera, the third camera, and the fourth camera to capture image data at temporally proximate times, and to configure the rolling directions of the first rolling shutter, the second rolling shutter, the third rolling shutter, and the fourth rolling shutter such that: the rolling direction of the second rolling shutter is substantially opposite the rolling direction of the first rolling shutter, the rolling direction of the third rolling shutter is substantially opposite the rolling direction of the second rolling shutter, and the rolling direction of the fourth rolling shutter is substantially opposite the rolling direction of the third rolling shutter.

2. The multi-camera system of claim 1, wherein each camera comprises:

a camera body;

a lens positioned on a front face of the camera body; and a communication interface for communicatively coupling to other cameras.

3. The multi-camera system of claim 2, wherein the front face of the third camera faces a direction 90° relative to the direction faced by the front face of the first camera, the front face of the second camera faces a direction 180° relative to the direction faced by the front face of the first camera, and the front face of the fourth camera faces a direction 270° relative to the direction faced by the front face of the first camera.

4. The multi-camera system of claim 3, wherein the first rolling shutter and the third rolling shutter substantially roll towards the overlap region facing a direction 45° relative to the direction faced by the front face of the first camera and the second rolling shutter and the fourth rolling shutter substantially roll towards a second overlap region facing a direction 225° relative to the direction faced by the front face of the first camera.

5. The multi-camera system of claim 3, wherein the first rolling shutter and the third rolling shutter substantially roll away from the overlap region facing a direction 45° relative to the direction faced by the front face of the first camera and the second rolling shutter and the fourth rolling shutter substantially roll away from a second overlap region facing a direction 225° relative to the direction faced by the front face of the first camera.

6. The multi-camera system of claim 1, wherein one of the first and second camera pair comprises cameras with a variable rolling shutter configurable to roll in at least two directions.

7. The camera system of claim 6, wherein the variable rolling shutter is configured by the first camera in response to detecting an orientation of the first camera and the second camera.

8. The multi-camera system of claim 1, wherein a camera housing orients the first and second camera pairs.

9. The multi-camera system of claim 8, wherein the camera housing orients one of the first and second camera pairs in an upside down orientation.

10. A camera system for mitigating field of view artifacts, the camera system comprising:

a first camera in a first orientation corresponding to a first field of view;

a second camera in a second orientation corresponding to a second field of view adjacent to the first field of view, wherein the second field of view and first field of view have an overlap region to facilitate stitching of panoramic image data;

a first rolling shutter of the first camera for enabling the capture of first panoramic image data from the first field of view, the first rolling shutter configured to roll towards or away from the overlap region; and a second rolling shutter of the second camera for enabling the capture of second panoramic image data from the second field of view, the second rolling shutter configured to roll towards or away from the overlap region, wherein the second rolling shutter and first rolling shutter both roll towards or away from the overlap region;

wherein the first camera is configured to capture the first panoramic image data by configuring the first rolling shutter to roll in a first direction, to configure the second camera to capture the second panoramic image data at a time temporally proximate to the capture of the first panoramic image data by the first camera, and to configure the second rolling shutter to roll in a second direction opposite the first direction.

11. The camera system of claim 10, wherein the orientation of the first camera and the orientation of the second camera are right side up.

12. The camera system of claim 11, wherein one of the first camera and the second camera includes a variable rolling shutter configurable to roll in two or more directions.

13. The camera system of claim 11, wherein the variable rolling shutter is user configurable.

14. The camera system of claim 11, wherein the variable rolling shutter is configured by the first camera in response to detecting an orientation of the first camera and the second camera.

15. The camera system of claim 10, wherein a camera housing orients the first camera in the first orientation and the second camera in the second orientation.

16. The camera system of claim 15, wherein the camera housing orients the first camera right side up and orients the second camera upside down.

17. The camera system of claim 15, wherein the camera housing orients the first camera and the second camera right side up.

18. The camera system of claim 15, wherein the camera housing communicatively couples the first camera to the second camera.

19. The camera system of claim 10, further comprising:

a third camera in a third orientation substantially corresponding to the first field of view, wherein the first camera is configured to configure the third camera to capture 3D image data from the first field of view at a time temporally proximate to the capture of the first panoramic image data by the first camera; and a fourth camera in a fourth orientation substantially corresponding to the second field of view, wherein the first camera is configured to configure the fourth camera to capture 3D image data from the second field of view at a time temporally proximate to the capture of the second panoramic image data by the second camera.

20. The camera system of claim 19, further comprising:
a third rolling shutter of the third camera, wherein the first camera is configured to configure the third rolling shutter to roll in the same direction as the first rolling shutter; and
a fourth rolling shutter of the fourth camera, wherein the first camera is configured to configure the fourth rolling shutter to roll in the same direction as the second rolling shutter.

21. A camera system for mitigating field of view artifacts, the camera system comprising:
a first rolling shutter of a first camera having a first roll direction, the first rolling shutter for exposing a first image sensor to a first field of view; and
a second rolling shutter of a second camera having a second roll direction, the second rolling shutter for exposing a second image sensor to a second field of view, the second and first field of view having an overlap region;
wherein the first camera is configured to configure the second rolling shutter such that the second roll direction is substantially opposite the first roll direction, and to configure the second camera to capture a second image at a time temporally proximate to the capture of a first image by the first image such that the first rolling shutter and the second rolling shutter expose the first image sensor and the second image sensor, respectively, to light at temporally proximate times.

* * * * *